United States Patent [19]

McCaskill et al.

[11] 4,029,294

[45] June 14, 1977

[54] HIGH PRESSURE VALVE

[75] Inventors: John Walton McCaskill, Houston; Robert D. Barnett, Magnolia; David P. Herd, Houston, all of Tex.

[73] Assignee: McEvoy Oilfield Equipment Co., Houston, Tex.

[22] Filed: Oct. 4, 1974

[21] Appl. No.: 512,092

[52] U.S. Cl. .................... 251/282; 137/246.12; 220/378; 251/328; 251/330; 277/167.5
[51] Int. Cl.² ................ F16K 5/22; F16K 41/14
[58] Field of Search .............. 251/326–330, 251/282; 137/246–246.23; 277/167.5

[56] References Cited

UNITED STATES PATENTS

| | | | |
|---|---|---|---|
| 2,433,638 | 12/1947 | Volpin | 137/246.12 |
| 2,563,244 | 8/1951 | Holicer | 251/330 |
| 2,657,898 | 11/1953 | Volpin | 137/246.12 |
| 2,780,233 | 2/1957 | Volpin | 137/315 |
| 2,830,665 | 4/1958 | Burns et al. | 166/75 R |
| 2,842,336 | 7/1958 | Johnson | 251/330 |
| 2,952,479 | 9/1960 | Rhodes et al. | 285/10 |
| 2,957,492 | 10/1960 | Volpin | 137/246.12 |
| 2,976,008 | 3/1961 | Ocker | 251/330 X |
| 3,007,719 | 11/1961 | Sherman et al. | 285/137 A |
| 3,013,769 | 12/1961 | Volpin | 251/327 X |
| 3,026,084 | 3/1962 | Bryant | 251/327 X |
| 3,057,630 | 10/1962 | Sneed | 277/165 |
| 3,095,004 | 6/1963 | Jackson et al. | 137/246.11 |
| 3,103,366 | 9/1963 | Dunn | 277/170 |
| 3,135,285 | 6/1964 | Volpin | 137/246.12 |
| 3,181,552 | 5/1965 | Jackson | 137/246.12 |
| 3,348,567 | 10/1967 | Volpin | 137/246.12 |
| 3,412,750 | 11/1968 | Volpin | 251/214 X |
| 3,428,297 | 2/1969 | Volpin | 251/355 |
| 3,432,177 | 3/1969 | Colwell | 277/236 X |
| 3,538,938 | 11/1970 | Volpin | 137/246.12 |
| 3,696,831 | 10/1972 | Fowler | 137/246.12 |
| 3,758,072 | 9/1973 | Herd | 251/332 |

FOREIGN PATENTS OR APPLICATIONS

| | | | |
|---|---|---|---|
| 582,186 | 8/1959 | Canada | 251/316 |
| 923,196 | 2/1947 | France | 277/167.5 |

OTHER PUBLICATIONS

1970–1971, vol. 2, "Composite Catalog of Oil Field Equipment and Services" — Gray Tool Co. brochure, p. 2254.
Gray Tool Co. Diagram — "Graygate."

Primary Examiner—Martin P. Schwadron
Assistant Examiner—Richard Gerard
Attorney, Agent, or Firm—David M. Ostfeld; Murray Robinson; Ned L. Conley

[57] ABSTRACT

A valve comprising a housing with an inlet and outlet and a chamber in between, a reciprocating gate mounted in a gate seat disposed within the chamber for opening and closing the valve, an upper bonnet for closing the chamber at one end and a lower bonnet for closing the chamber at the other end, the gate being disposed between upper and lower stems which extend into the upper and lower bonnets respectively. Metal-to-metal seals are provided at all junctures between the above members in the lower gate position with back-up seals at the junctures of all moving members.

A double edged seal ring integral with the upper stem self-contained within the upper bonnet provides a metal-to-metal seal with the upper bonnet in the upper and lower gate positions of the valve.

A metal gasket arrangement is provided between the upper bonnet and valve body whereby the assemblage of all points of contact between the gasket and body form an annular ring.

A combination seal ring of metal and plastic is disposed between the gate seat and valve body at the outlet whereby the metal prevents the plastic from extruding between the seat and body and into the outlet.

A removable backseat may be used to simultaneously seal the upper bonnet and upper stem upon moving the valve to one of its positions.

15 Claims, 10 Drawing Figures

HIGH PRESSURE VALVE

REFERENCE TO RELATED PATENTS AND PUBLICATIONS

Two related applications also entitled High Pressure Valve are being filed concurrently herewith and assigned to the same assignee as the present application. These are U.S. patent application Ser. No. 511,991, filed Oct. 4, 1974, now abandoned, and U.S. patent application Ser. No. 512,368, filed Oct. 4, 1974, now abandoned, and U.S. patent application, Ser. No. 655,693, filed Feb. 6, 1976, a divisional application of U.S. patent application 512,368, filed Oct. 4, 1974. The disclosures of the aforementioned concurrent applications are incorporated herein by reference.

BACKGROUND OF THE INVENTION

1. Field Of The Invention

This invention pertains to valves and especially to gate valves suitable for high pressure service. The invention is particularly directed to improvements in the seals and sealing arrangment for a through-conduit, rising stem high pressure gate valve.

2. Description Of The Prior Art

Gate valves have been commonly used for many years and have been employed in a variety of services such as in the oil and/or gas services of the petroleum industry. However, such valves have been designed for service involving pressures of only several thousand pounds per square inch. Today due to the depleted energy supply it has become necessary to explore and produce oil and gas under very high pressures of the range 30,000 psi (pounds per square inch) or more. Such high pressures have required greater sealing capacity and better safety features in such valves.

Prior art gate valves generally consist of a valve body having inlet and outlet conduits with a chamber therebetween. A gate having an opening therethrough is disposed in a gate seat mounted within the chamber and the gate is mounted on a stem. The chamber is closed by a bonnet affixed to the valve housing. The stem reciprocates within the bonnet and is attached to a reciprocating apparatus for moving the gate between a closed position in which flow is blocked through the conduits and an open position in which flow is allowed through the conduits and the gate opening. Such a valve is illustrated in U.S. Pat. Nos. 3,538,938 and 3,696,831.

A gasket seal is provided to seal between the bonnet and the valve housing. A ring gasket has been used as shown in U.S. Pat. Nos. 2,433,638; 2,842,336; and 3,696,831 or an o-ring seal as shown in U.S. Pat. Nos. 3,095,004 and 3,135,285. It is well known to use a standard metal joint gasket received in grooves at the flange faces of two wellhead members as shown in U.S. Pat. Nos. 2,830,665 and 3,007,719. Such gaskets may have a diamond shaped cross-section or a T-shaped cross-section as advertised by Gray Tool Company on pages 2217-2272 in the 1970-71 Composite Catalog published by World Oil. A resilient steel ring with o-rings for sealing between a valve housing and a bonnet of a gate valve is shown in U.S. Pat. No. 2,780,233.

It is well known to seal between the gate seat and the valve housing by using an o-ring as shown in U.S. Pat. Nos. 2,957,492 and 3,348,567. Further in automatic pressure sealed gate valves shown in U.S. Pat. Nos. 3,095,004; 3,538,938; and 3,696,831 fluent sealant rings are disposed around the gate seats to provide sealing between the valve housing and gate seats in response to line pressure on fluent sealant reservoirs in communication with the fluent sealant rings, and o-rings are installed on each side of the fluent sealant rings to isolate the fluent sealant in the fluent sealant rings from contamination by line fluids. This same principle is used for seals in well-heads as shown in U.S. Pat. No. 2,952,479. It is also known to locate an o-ring seal on the end of the gate seat as shown in U.S. Pat. No. 3,696,831. U.S. Pat. Nos. 3,057,630 and 3,758,072 teach combining an elastomeric O-ring and a polyfluoroethylene polymer such as the brand "Teflon" or "nylon" or other low-friction plastic ring to make a seal ring. Further U.S. Pat. No. 3,103,366 teaches a deformable metal ring, as for example of aluminum, with an inner deformable plastic ring of polytetrafluororoethylene whereby the metal ring can adapt itself to slightly varying recess clearances and prevent the plastic ring from extruding through the clearances under pressure.

Generally the stem is sealed with the bonnet by means of a seal such as an o-ring, compressed sealant, or chevron packing as are shown in U.S. Pat. Nos. 2,657,898; 2,780,233; 2,842,336; 2,957,492; 3,095,004; 3,181,552; and 3,696,831. Various valves such as are disclosed in U.S. Pat. Nos. 2,657,721; 2,780,233; 2,842,336; 3,348,567 show back seats which are actuated to provide a metal-to-metal seal between the stem and the bonnet and/or valve housing when it is necessary to replace the packing around the stem. U.S. Pat. No. 3,013,769 discloses two separate seat rings mounted on the stem one of which will sealingly engage the bonnet either in the open position or in the closed position of the valve. U.S. Pat. No. 3,538,938 illustrates upper and lower stem sections with annular packing between the upper stem section and bonnet and between the lower stem section and valve housing, and further discloses upper and lower enlargements mounted on the upper and lower stem sections respectively.

The sealing systems and arrangements of the prior art gate valves were designed for working pressures in the range of several thousand pounds psi and are not able to service working pressures in the range of 30,000 psi. The prior art valves do not provide back-up seals if the stem seals blow out under high pressure and the stem seals are elastomeric seals and not metal-to-metal seals. Such sealing systems may permit the leakage of poisonous hydrogen sulfide gas under high pressure. Further gate seat seals will extrude and roll out of the seal grooves under high pressures.

SUMMARY OF THE INVENTION

The present invention discloses a unique sealing system and arrangement for a high pressure gate valve servicing pressures in the range of 30,000 psi. In the lower gate position, dual seals are provided between the upper stem and bonnet, between the lower stem and valve housing, and between the gate seat and valve housing. Each of such dual seals provide a metal-to-metal seal with a back-up seal to prevent a blow out and to isolate the back-up seals from long exposure to line fluids.

The present system provides a unique double edged backseat disposed on the stem and self-contained within the bonnet to sealingly engage the bonnet in either the open or closed position of the valve.

In an alternative embodiment two separate backseats, one of which is a removable backseat, are disposed on the stem to sealingly engage the bonnet in either the open or closed position of the valve. The removable backseat has a unique simultaneous double sealing engagement which provides metal-to-metal sealing engagement with both the bonnet and stem simultaneously which prevents leakage between the removable backseat and stem and between the stem and bonnet.

A sealing assembly is utilized to provide a metal-to-metal seal between the bonnet and valve housing and to permit the assembly of the double edged seal within the bonnet. Such assembly includes a metal gasket ring for sealing between the bonnet and valve housing where there are only three annular loci of points of contact between the ring, bonnet, and valve housing thereby permitting a smaller bonnet and housing.

A combination metal-plastic ring is used to provide sealing engagement between the gate seats and the valve housing. As line pressure is applied to the plastic, the metal provides a seal and prevents the plastic from extruding between the gate seat and valve housing and into the outlet.

In an alternative embodiment two wedging rings having opposing cam surfaces are disposed downstream of a plastic ring to provide a seal between the gate seats and valve housing and to prevent the plastic from extruding between the gate seat and valve housing and into the outlet.

The lower stem is permitted limited movement axially with respect to the gate thereby permitting a metal-to-metal seal between the lower stem and the valve housing at the same time metal-to-metal sealing engagement is made between the upper stem and the bonnet when the gate is in the lower position. The lower stem seal with the valve housing is activated by line pressure while the upper stem seal is activated mechanically.

The present application is one of three related applications in one of which the entire sealing system and arrangement are claimed, in another the sealing assembly is claimed, and in another the double edged backseat is claimed.

Other objects and advantages of the invention will appear from the following description.

BRIEF DESCRIPTION OF THE DRAWINGS

For a detailed description of a preferred embodiment of the invention, reference will now be made to the accompanying drawings wherein.

DESCRIPTION OF THE PREFERRED EMBODIMENT

The valve, in accordance with the preferred embodiment illustrated in FIGS. 1–5, inclusive, is of the through-conduit, rising stem, gate type, comprising a valve housing or body 10 having opposed flow ports 12, 14 either of which may be the inlet or outlet depending upon the orientation of the valve in the line in which the valve is mounted, forming the flowway 16 which is intersected interiorly of the housing 10 by a cylindrical closure or gate chamber 18 whose axis is generally at right angles to the flow way. As illustrated, flow port 14 is the upstream portion or inlet of the valve and flow port 12 is the downstream or outlet of the valve. The fluent material flowing through the line and valve shall be termed line fluids. The inner ends of flow ports 14, 12 are provided with coaxial counterbores 20, 22 respectively, circumscribing flow ports 12, 14 and forming inwardly facing annular shoulders 24, 26 and inwardly facing cylindrical walls 28, 30 respectively, the counterbore walls 28, 30 having a larger diameter than the diameter of flow ports 12, 14.

Figure 1:
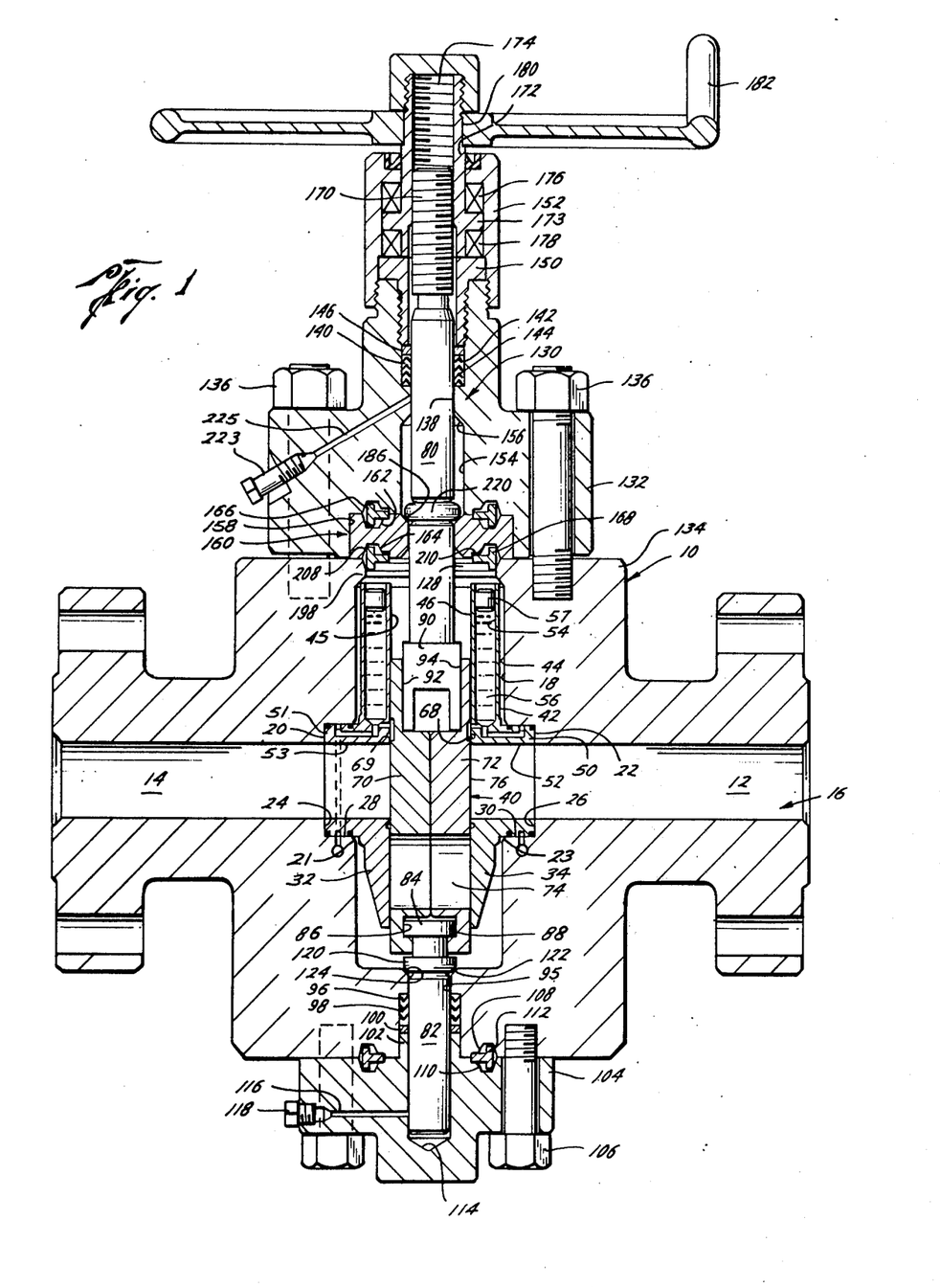
FIG. 1 is an elevation view in section of a valve according to a preferred embodiment of the invention showing the valve in the closed position.

Closure chamber 18 and counterbores 20, 22 are adapted to receive a pair of gate seat members 32, 34 respectively. As gate seat members 32, 34 and their appurtenances are identical in construction and are arranged symetrically on opposite sides of closure chamber 18, the description of one will, it will be understood, be applicable to both.

The gate seat member 34 is elongate in form, having an inwardly facing surface shaped to cooperate in sliding engagement with the abutting face of gate 40, as will be described hereinafter, and an outwardly facing surface 42 shaped to be substantially complimentary to the shape of the portion of the wall 44 forming closure chamber 18 surrounding the flowports 12, 14 and extending longitudinally of the chamber 18. In the illustrative embodiment where gate 40 is of the flat-sided form, inner surface 46 will likewise be flat. Further, gate seat member 34 includes a seat neck or hub 50 to be received by counter-bore 22. Gate seat member 34 is provided with a transverse opening 52 coaxial and registering with flow port 12 and flowway 16 and generally of the same diameter to provide full open flow therethrough.

Figure 3:
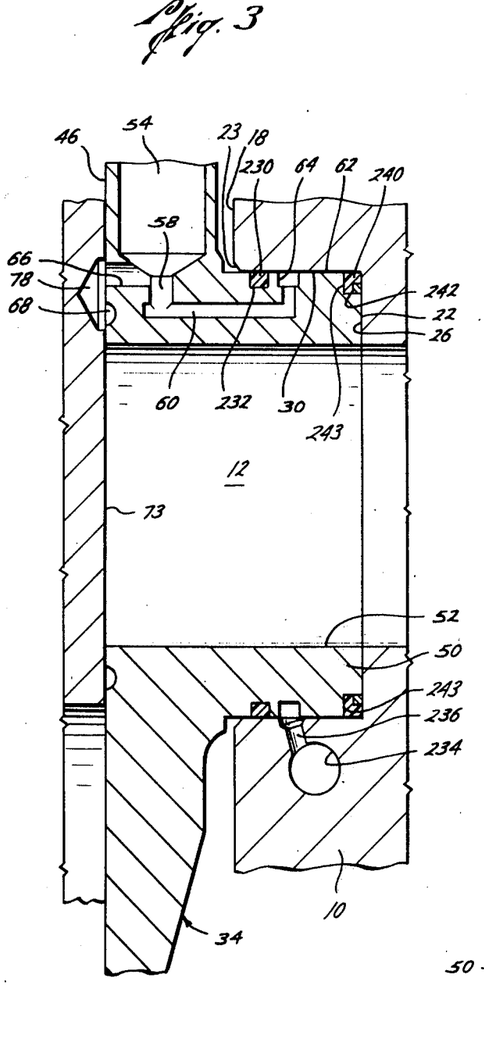
FIG. 3 is an enlargement of a portion of one of the gate seats and valve housing shown in FIG. 1.

The upper end portion of gate seat member 34 is bored from its outer end to provide a reservoir 54, adapted for receiving a flowable or fluent sealant 56, such as is conventionally used in automatically sealing valves. A cylindrical piston or barrier 57 is slidably mounted in reservoir 54 for pressurizing the sealant as will be subsequently described. Referring now to FIG. 3 the lower end of reservoir 54 communicates through a longitudinal passage 58 with a passage 60 which extends transversely through the body of the gate seat member 34 to the outer peripheral surface 62 of seat hub 50. The outer end of transverse passage 60 communicates with an annular sealant groove 64 formed in outer surface 62 of gate seat member 34 encircling opening 52. The lower end of reservoir 54 also communicates through a transverse passage 66 which communicates with the exterior of inner face 46 of gate seat member 34 and is spaced from an annular sealing groove 68 formed in inner surface 46 encircling opening 52.

Referring to FIG. 3 a threaded socket 234, shown generally, is formed in the side of body 10 and is adapted to receive a conventional pressure fitting for introducing sealant material 56 into socket 234. With this arrangment, it will be seen that sealant 56 introduced through the fitting will be forced via passage 236 through groove 64, thence via passage 60 and 58 into the interior of reservoir 54 below barrier 57.

Figure 2:
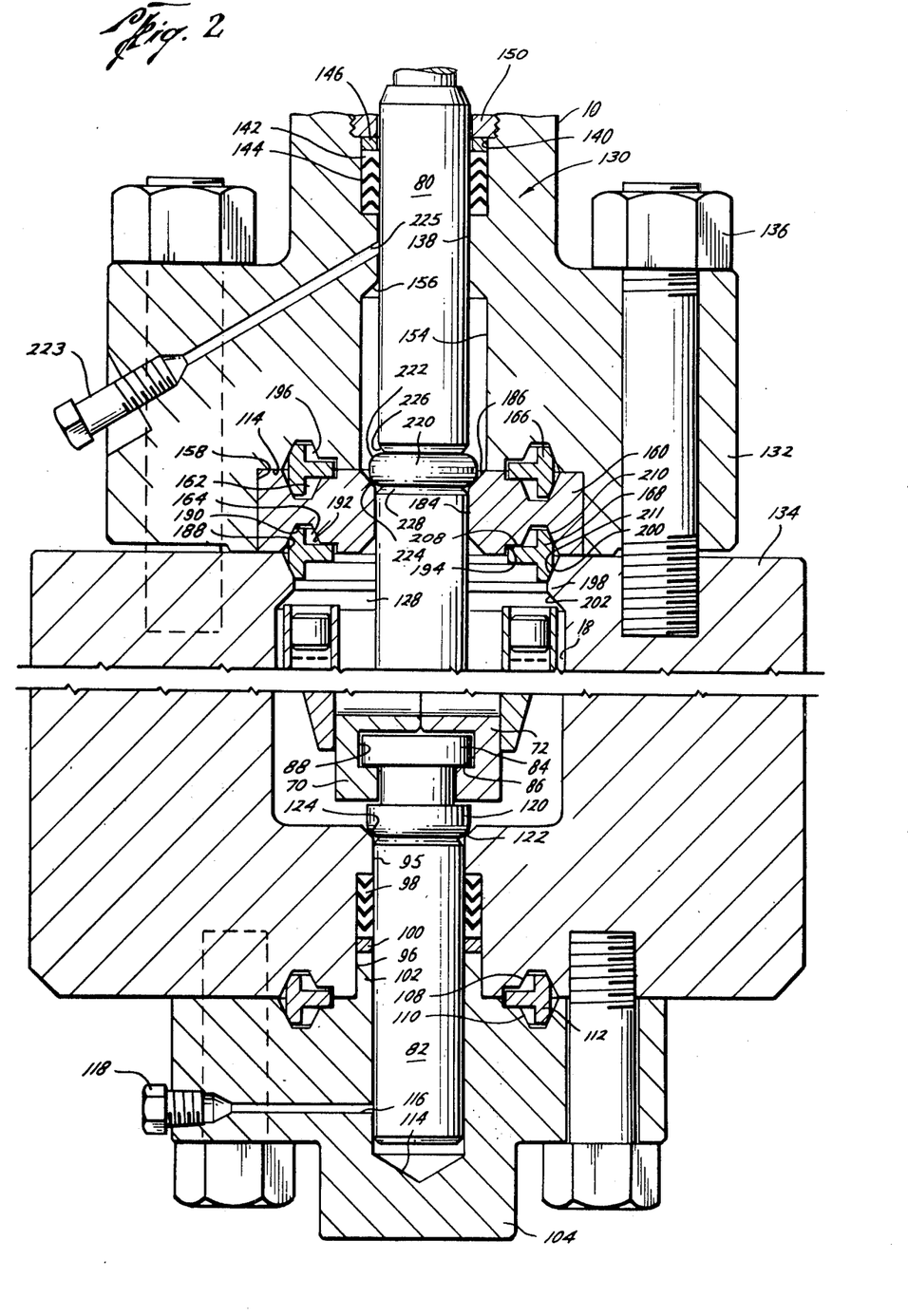
FIG. 2 is an enlargement of the upper and lower portions of the view of the valve shown in FIG. 1.

Referring again to FIG. 1, gate 40 is disposed in closure chamber 18 for vertical reciprocation across the flowway 16 between the gate seats 32, 34. The gate 40 is constructed of a pair of mating generally rectangular gate segments, 70, 72 having flat outer faces adapted for slidable engagement with the inner end faces 45, 46 of the seat members 32, 34. The gate 40 is provided near its lower end with a transverse flow port 74, defined by registered openings in gate segments 70, 72, and adapted to register with openings 52, 53 in seat members 32, 34 when the gate 40 is in the raised or flowway-opening position. The upper portions of the gate segments 70, 72 form the closure section 76 which is adapted to cut off flow through flowway 16 when the gate is in the lower or flowway-closing position as seen in FIGS. 1, 2, and 3. The upper portion of gate segment 72 is provided on its outer face with a jumper recess 78 shown in FIG. 3 adapted to communicate sealant groove 68 with the inner end of transverse passage 66 when gate 40 and gate segment 72 are in the flowway-closing position as shown in FIG. 3. It will be understood that when the gate 40 is moved upwardly to the flowway-opening position, the corresponding displacement of recess 78 will serve to disconnect groove 68 from passage 66.

It should be understood that the valve shown in the figures is normal acting in that during service of the valve it is anticipated that the valve will generally be closed to fluid flow. However the valve could obviously be reverse acting whereby during service the valve would generally be in the open position. The normal acting valve shown can be made reverse acting by merely modifying gate segments 70, 72 whereby transverse flow port 74 will register with openings 52, 53 when the gate is in the lower position rather than in the upper position as previously described. Note that regardless of whether the valve is normal acting or reverse acting, the normal position (i.e. the general position of the valve during operation) will occur when the gate 40 is in the lower position.

Figure 4A:
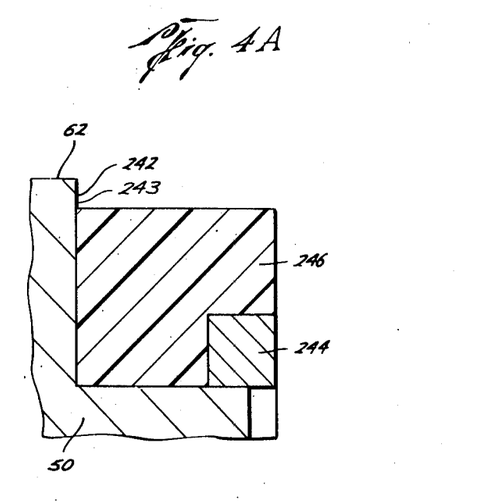
FIG. 4A is an axial section view of the gate seat seal shown in FIG. 3 prior to installation of the gate seat in the valve housing as shown in FIG. 3.
Figure 4B:
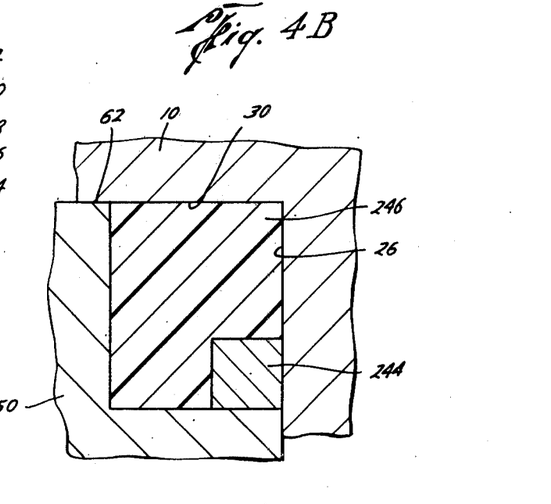
FIG. 4B is an axial section view of the gate seat seal shown in FIG. 3 after installation of the gate seat in the valve housing as shown in FIG. 3.

Referring now to FIGS. 3, 4A and 4B, seals 230, 240 are received in annular grooves 232, 242 which circumscribe seat hub 50 for sealing with surface 30 of housing 10 on opposite sides of the sealant groove 64. Seal 230 is an elastomeric or plastic o-ring seal while seal 240 is an integral plastic-metal seal ring. Seal 240 includes an annular metal ring 244 and a polyfluoroethylene polymer such as the brand "Teflon", or "nylon" or other low-friction plastic annular ring 246. Groove 242 is located at the outer peripheral corner of hub 50 whereby groove 242 is two-sided with the opposing surfaces of counter-bore 22 providing the other two sides. Ideally the thickness of seal 240 will be equal to the length of the groove 242 with the tolerance being on the side of seal 240 having a greater thickness. Preferably the volume of groove 242 will substantially equal the volume of seal 240. The metal ring 244 has a close fit around groove 242 and is preferably press fitted onto groove 242. Upon assembly as shown in FIGS. 1 and 4B gate seat members 32, 34 are inserted into closure member 18 whereby opposing seat hubs 50, 51 are inserted into corresponding counterbores 20, 22 respectively. The leading edges 21, 23 at the entrances of counterbores 20, 22 respectively are beveled to facilitate the assembly of hubs 50, 51. Upon assembly the metal ring 244 engages the bottom of groove 242 and shoulder 26 of counterbore 22 with plastic ring 246 substantially filling the remainder of groove 242.

The surfaces between shoulder 26 of counterbore 22 and the end face 243 of hub 50 cannot be matingly machined to effect a proper seal thereby requiring seal 240. However, such machining may be accomplished for a proper metal-to-metal sealing engagement between the outer wall 73 of gate segment 72 and the inner surface 46 of gate seat member 34. Further it should be noted that to effect an adequate seal with seal 240, the area of the radially extending annular wall 243 of groove 242 facing towards shoulder 26 of counterbore 22 must be less than the area of gate segment 72 encircled by sealant groove 68 exposed to line pressure through port 12. If the pressure on wall 43 due to sealant 56 is greater than the pressure on gate segment 72 due to line pressure, wall 243 will tend to move away from shoulder 26 thereby disengaging seal 240.

Referring now to FIGS. 1 and 2 gate 40 is reciprocated by means of a pressure balanced stem having an upper stem member 80 and a lower stem member 82. Lower stem member 82 includes a head 84 at its upper end which is enclosed between gate segments 70, 72 within counterbores 86, 88 in the inner faces of the lower portion of segments 70, 72. Counterbores 86, 88 have sufficient axial length to permit limited axial movement of head 84 with respect to gate 40. Upper stem member 80 includes a T-shaped lug member 90 threaded or welded onto the lower end of upper stem member 80. The T-shaped lug member 90 is also enclosed between gate segments 70, 72 within corresponding T-shaped and semi-circular counterbores 92, 94. This structure is old and forms no part of the present invention, therefore a more detailed description has not been made.

The lower end of the valve housing 10 is provided with a bore 95 coaxial with chamber 18 and with a counterbore 96 opening from the outer end of housing 10 forming a stuffing box for receiving lower stem member 82 and adapted to receive an annular packing 98 under compression by a compression ring 100 and a gland 102 protruding from a lower closure cap 104 secured to the housing 10 by cap screws 106 or possibly by bolts. The housing 10 and closure cap 104 have corresponding mating annular grooves 108, 110 for receiving a lower ring gasket 112 to provide a metal-to-metal seal therebetween. The lower closure cap 104 has a bore 114 for slidingly receiving the lower stem member 82. A transverse passage 116 in closure cap 104 provides communication between bore 114 and bleeder valve 118 to relieve any build up of line fluids in bore 114. The lower stem member 82 reciprocates in response to reciprocal movement of the gate 40, and packing 98 serves to slidably seal about the lower stem member 82.

There is provided on the upper portion of lower stem member 82 below head 84 a metal seat ring 120 defining a downwardly facing annular shoulder 122 surrounding the lower end of seat ring 120. Shoulder 122 is arcuate and cooperates with a bevelled seat 124 located at the entrance of bore 95 at the bottom of chamber 18 forming a line contact and a metal-to-metal seal therewith as will be described subsequently.

Referring to FIG. 2 the upper end 128 of chamber 18 is adapted to be closed by means of a tubular cap or bonnet 130 having a closure flange 132 secured to the upper end 134 of housing 10 by means of studs 136 or possibly by bolts or capscrews. Bonnet 130 has an axial bore 138 for receiving upper stem member 80. Upper stem member 80 has a double seal or backseat 220 radially projecting from and integral (i.e. the backseat 220 and stem 80 are one piece) with upper stem 80 thereby preventing any leakage behind the backseat 220. Backseat 220 has upwardly facing and downwardly facing rounded shoulders 222, 224 and stress relief grooves 226, 228 adjacent thereto on each side of backseat 220. Shoulders 222, 224 are placed approximately back to back to limit the longitudinal dimension of bonnet 130.

Axial bore 138 includes an enlarged portion 154 having a diameter greater than the diameter of backseat 220 for receiving same. Enlarged portion 154 terminates in a lower counterbore 158 which is adapted to receive closure ring 160 having an axial stem - receiving bore 184 coaxial with closure chamber 18 and bonnet bore 138. In the assembly of the valve upper stem member 80 is inserted into bore 138 with enlarged portion 154 receiving backseat 220. Closure ring 160 then slides around upper stem member 80 behind backseat 220 and is received by counterbore 158. It is at this time that lug member 80 is threaded onto upper stem member 80 for attachment with gate 40 and gate 40 is inserted between gate seat members 32, 34.

Closure ring 160 when received within counterbore 158 makes enlarged portion 154 into a chamber for the reciprocation of backseat 220. Enlarged portion 154 forms an internal downwardly facing beveled shoulder or seat 156 and ring 160 includes an upwardly facing beveled conical shoulder or seat 186 at the upper end of bore 184 opposing shoulder 156 after assembly.

Backseat 220 and seat ring 120 are formed in spaced-apart relation on upper stem 80 and on lower stem 82 respectively whereby in the closed flowway position, backseat 220 will sealingly engage shoulder 186 providing a metal-to-metal seal therebetween and seat ring 120 will sealingly engage shoulder 124 providing a seal therebetween as the line fluid pressure forces seat ring 120 downwardly by means of the limited axial movement of head 84 within counterbores 86, 88. Backseat 220 is also spaced on upper stem 80 whereby in the open flowway position seat 220 will sealingly engage shoulder 156 providing a metal-to-metal seal therebetween.

The closure ring 160 and its appurtenances are identical in construction and are arranged symmetrically on both upper and lower sides to permit reversability, so the description of one will be applicable to both. Ring 160 includes an upper and lower ring gasket groove 162, 164 for receiving upper and lower metal ring gaskets 166, 168 for sealing between the bonnet 130 and ring 160 and ring 160 and housing 10. Ring gasket groove 164 includes a downwardly and inwardly facing frusto-conical seat or shoulder 188, a downwardly facing inner annular shoulder 190, a downwardly and outwardly facing beveled conical shoulder 192, and a downwardly facing outer annular shoulder 194. Shoulders 188, 192 and 194 having decreasing diameters respectively. The bottom portion of counterbore 158 includes a ring gasket groove 196 having the same features and dimensions as groove 164. Further ring gasket groves 108, 110 in lower housing 10 and cap 104 have the same features, dimensions and arrangements as grooves 196, 162. At the mouth of closure chamber 18 there is an inwardly extending annular boss 198 bounded by upper and lower frusto-conical shoulders or seats 200, 202. Shoulder 200 mates and opposes shoulder 188 on closure ring 160. However, there is no corresponding upwardly facing annular shoulder on boss 198 opposing shoulder 194 on closure ring 160.

Ring gaskets 112, 166 and 168 are identical in dimension for interchangeability and therefore a description of one will apply to all.

Figure 5A:
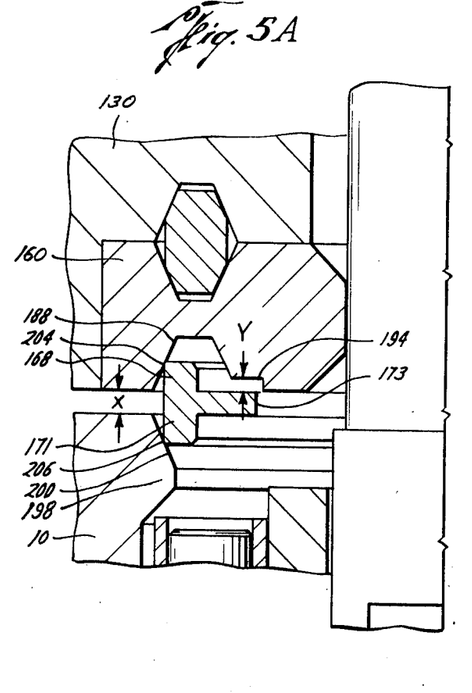
FIG. 5A is an axial section view of the initial mating of the bonnet gasket between the bonnet and valve housing illustrated in FIG. 1.
Figure 5B:
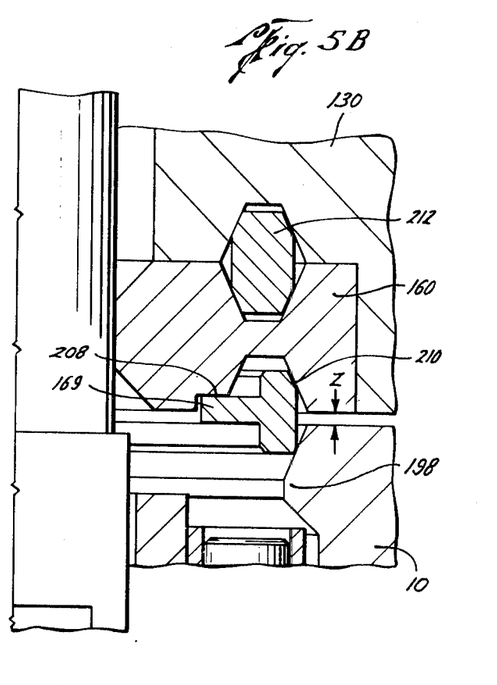
FIG. 5B is an axial section view of the bonnet gasket installed in the bonnet and ready for installation in the valve housing.

Referring now to FIGS. 5A and 5B, ring gasket 168 is an annular ring having a T-shaped cross section. The stem 169 of the T-shaped cross section lies in a horizontal plane perpendicular to the axis of the bore 173 of the gasket 168 and the head 171 of the T-shaped cross section lies in a vertical plane parallel to the axis of the bore 173. The outer peripheral annular edges 204, 206 of the head 171 are beveled for engagement with annular seats or shoulders 188, 200 respectively. Gasket 168 is made of metal, preferably steel.

FIG. 5A illustrates the initial assembly position of gasket 168, before the gasket is compressed. The dimension X between closure ring 160 and housing 10 is approximately twice the dimension Y between stem 169 and shoulder 194 whereby as studs 136 are tightened, bonnet 130 and closure ring 160 will move downwardly the distance Y until annular shoulder 194 contacts the upwardly facing surface of stem 169 of gasket 168. This position is illustrated in FIG. 5B at which time the dimension Z between closure ring 160 and housing 10 is approximately one-half the dimension X. Upon tightening studs 136, gasket 168 is engaged at points 208, 210 by closure ring 160 and is forced against shoulder 200 until the connection is complete as shown in FIG. 1 and 2. As shown in FIG. 2, gasket 168 has surface-to-surface contact at 211 with shoulder 200 of housing 10. Upon completion of the assembly gasket 168 engages closure ring 160 at points, the assemblage or loci of which, forms two annular rings, and gasket 168 engages housing 10 at points, the assemblage or locus of which, forms a single annular ring. During the assembly beveled edges 204, 206 are deformed against shoulders 188, 200 thereby establishing a high pressure metal-to-metal seal. Such deformation occurs because the median diameters of corners 204, 206 are slightly larger than the median diameters of shoulders 188, 200.

Standard metal ring gasket seals, as illustrated in FIGS. 5A and 5B at 212, which is slightly different than that shown in FIG. 1, may be used in grooves 162, 196, and 108, 110 since the ring grooves are symmetrical with opposing surfaces. However, such gaskets cannot be used between bonnet 130 and housing 10 because there is no upwardly facing annular shoulder on boss 198 corresponding to shoulder 194 on ring 160 as previously shown. The lack of this shoulder causes a standard gasket ring to be unstable, to rock under load and to misalign on shoulder 200 during assembly thereby providing a bad seal. If gasket 168 attempts to cock, stem 169 engages shoulder 208 which forces gasket 168 back into alignment. To place a shoulder on boss 198 would require a larger housing 10 and a larger bonnet 130 to provide clearance for the installation and removal of gate 40 and gate seat members 32, 34.

Referring now to FIG. 1, upper stem member 80 is provided with an externally threaded portion 170 at its upper end which extends through stuffing box 142 wherein packing 144 serves to slidably seal about the stem member 80. An internally threaded drive nut 172 extends into cap 152 and is internally threaded at 174 to threadingly engage threaded portion 170 whereby rotation of the nut 172 will serve to raise and lower the closure member, i.e. stem members 80, 82 and gate 40, in accordance with the direction of the rotation of the nut 172, in order to move the gate 40 between flowway-opening and flowway-closing positions. The lower end of the nut 172 has an annular flange 173 which supports upper antifriction bearings 176 against the top of the cap 152 and bears against lower antifriction bearings 178 which rest on gland 150. The upper portion of the nut 172 which projects above the cap 152, is provided with conventional flats at 180 for mounting an operating wheel 182 or other conventional operator, by which the gate 40 is actuated.

A bleeder valve 223 communicating with bore 138 by means of passage 225 through bonnet 130 provides a means to relieve bore 138 of any build up of line fluids when packing 144 is to be replaced.

The metal-to-metal seals at 156, 222; 186, 224; and 120, 124 isolate packing 144 and 98 from long exposure to line fluids thereby preserving packing 98, 144 from deterioration. Further the packing 98, 144 and such metal-to-metal seals provide dual sealing as a safety feature so if one seal blows or ruptures, there is a back up seal. Such metal-to-metal seals also provide the capability to remove and replace packing 98, 144 while the valve is under pressure although packings 98 and 144 are designed to operate throughout the life of the valve.

In operation as the valve is closed by operator 182, upper stem 80, gate 40, and lower stem 82 move downwardly into the lower position. Seat 120 on lower stem 82 seals with shoulder 124. Seat 120 is not mechanically actuated into sealing engagement but the line pressure forces seat 120 into sealing engagement with shoulder 124. Such movement by seat 120 is allowed by the limited axial movement permitted between head 84 and gate 40, which may be considered a lost motion connection. Backseat 220 then engages shoulder 186 forming a metal-to-metal seal. After seat 120 engages shoulder 124, further movement downwardly by upper stem 80 drives backseat 220 onto shoulder 186. As the valve is opened by operator 182, backseat 220 travels upwardly until backseat 220 sealingly engages shoulder 156 providing a metal-to-metal seal.

In closing or opening the valve, bleeder valve 118 should be open whereby the line pressure will provide a balanced pressure force on both the lower stem 82 and upper stem 80. Without such a balanced pressurized stem, the pressure on the upper stem 80 would place such a load on stem 80 as to require a very high torque to be used on stem 80 to open and close the valve. Bleeder valve 118 is used to bleed out pressure below lower stem 82 so as to prevent any upward pressure on stem 82.

It will be seen that when the gate 40 is moved to the flowway-closing position, shown in FIG. 1, the differential line pressure across the closed valve will act on the downstream reservoir 54, the differential line pressure being exerted against the barrier 57 urging it inwardly of reservoir 54 and simultaneously forcing sealant 56 from reservoir 54 into sealant groove 64 to seal off between outer surface 62 of the hub 50 and the surrounding wall 30 of chamber 18, and through passage 66 and recess 78 into sealant groove 68 provided at the inner surface of the seat member 72 to seal about the opening between the seat member 34 and the related closure segment 72. Thus, sealant seals will automatically be provided between both surfaces 46, 62 of the seat member 34 and the related portions of the closure segment 72 and the wall 30 of chamber 18. The sealing action will be simultaneous.

Seals 230, 240 will be effective to prevent loss of sealant 56 from sealant groove 64. This permits effective sealing of the exterior of seat hub 50 while assuring against loss of sealant 56 due to any gap between the hub 50 and body 10 at counterbore 22.

As line pressure reaches 30,000 psi, the yield strength of ordinary sealing materials is approached under confined stress. Even below yield stress, there is substantial movement so that ordinary o-rings will not hold. The differential pressure between chamber 18 and sealant groove 64 is very low but the differential pressure between groove 64 and port 14 is very high placing much pressure on seal 240. However, as high pressure is placed on plastic ring 246, metal ring 244 is forced into the corner of groove 242 closing any gap or clearance at the downstream juncture of the hub 50 and housing 10 and preventing the plastic ring 246 from extruding through any downstream clearance between the end face 243 of hub 50 and shoulder 26. The metal ring 244 can adapt itself to varying clearances between the hub 50 and housing 10 so that these are not critical. Thus the high pressure helps the seal.

Figure 6A:
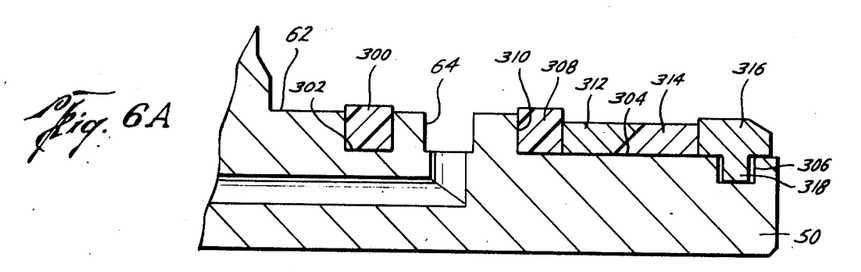
FIG. 6A is an axial section view of an alternative embodiment of the gate seat seal prior to installation in the valve housing.
Figure 6B:
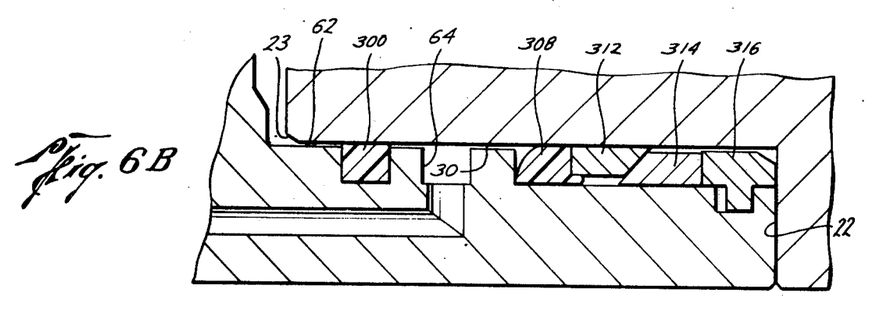
FIG. 6B is an axial section view of the embodiment of the gate seat seal shown in FIG. 6A installed in the valve housing.

FIGS. 6A and 6B illustrate an alternative sealing system for sealant groove 64 by sealing between surface 62 of hub 50 and wall 30 of counterbore 22. As shown in the unassembled position in FIG. 6A, a plastic seal ring 300 is received in annular groove 302 in hub 50 interiorly of sealant groove 64. On the outer end portion of hub 50 is a reduced diameter portion 304 having an annular channel 306 on the outer end of portion 304. A plastic seal ring 308 is slipped over the portion 304 against annular shoulder 310 formed by the reduction in diameter of portion 304. Two annular wedge or cam rings 312, 314 having opposing upwardly and downwardly facing bevels are slipped over portion 304. Then a split backup ring 316 having two semi-circular sections and an inwardly extending annular projection 318 is installed by inserting annular projection 318 into channel 306. Projection 318 has a shorter length than the depth of channel 306. For assembly purposes the outer peripheral corner of backup ring 316 is chamfered for ease of insertion of hub 50 by contacting bevel 23 of housing 10. Further bevel 23 forces plastic rings 300, 308 into compression within grooves 302 and portion 304.

Upon expansion of the annular channel formed between reduced portion 304 and wall 30 due to line pressure, as shown in FIG. 6B, wedge ring 312 will tend to cam onto wedge ring 314 creating a metal-to-metal sealing engagement between portion 304 and wall 30. Further such sealing engagement will prevent the extrusion of plastic seal ring 308 as shown in FIG. 6B. Such camming or wedging or rings 312, 314 occurs from the radial support from housing 10 and hub 50.

Figure 7:
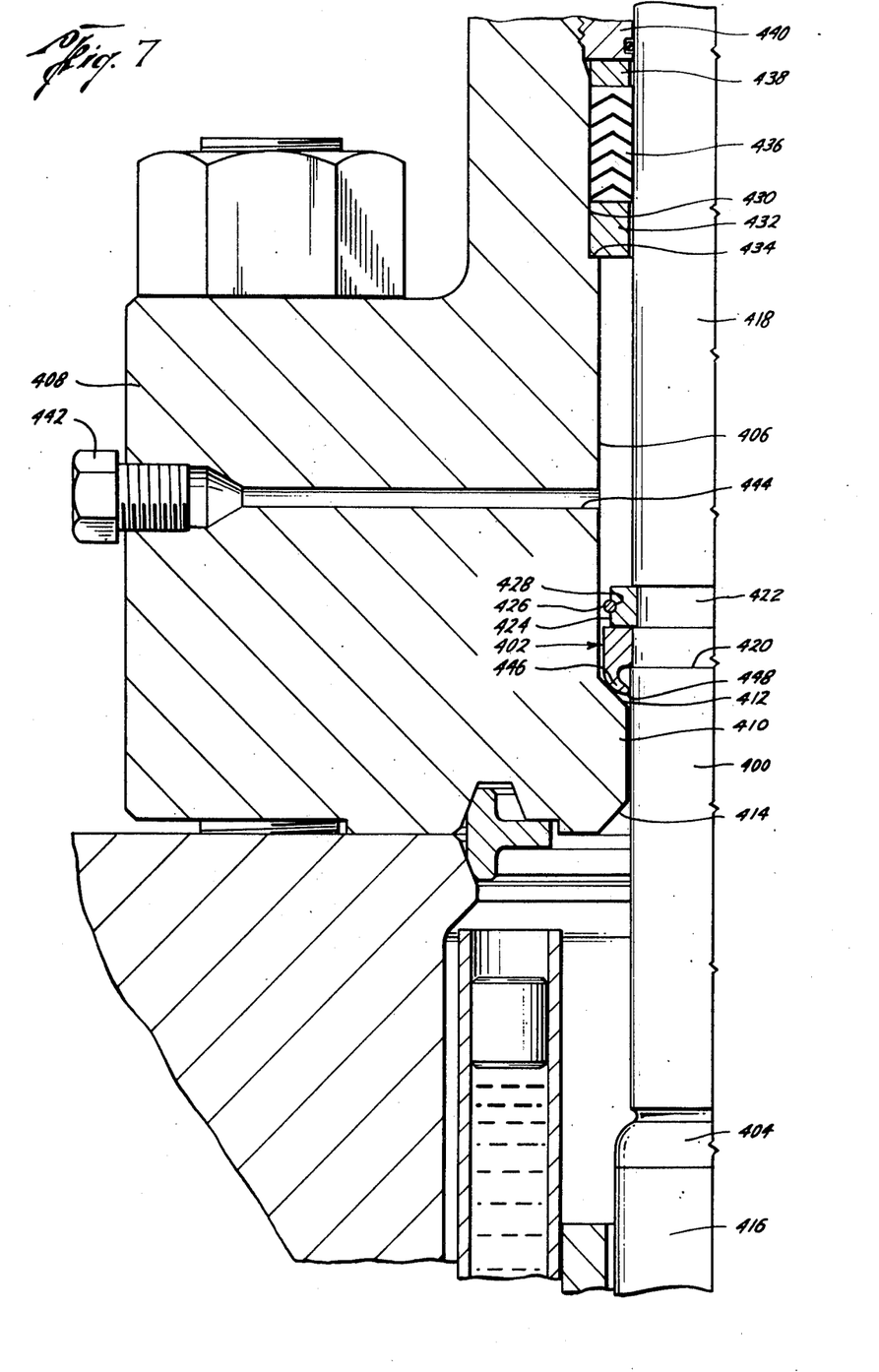
FIG. 7 is an axial section view of an alternative embodiment illustrating a removable backseat disposed on the upper stem.

An alternative embodiment to the integral double backseat 220 is illustrated in FIG. 7. The upper stem member 400 includes a removable backseat seal 402 and an integral single backseat seal 404. In this embodiment closure ring 160 may or may not be used. Ring 160 is no longer necessary because without integral double backseat 220 on upper stem member 80, upper stem member 80 could be received into bore 406.

Bonnet 408 includes an inwardly radially extending boss 410 having an upwardly facing beveled shoulder 412 for engagement with backseat 402 and a downwardly facing beveled shoulder 414 for engagement with backseat 404.

Backseat 404 is disposed on upper stem member 400 above lug member 416 and in spaced relation with the opening of the gate whereby in the raised or open flowway position backseat 404 sealingly engages shoulder 414 creating a metal-to-metal seal.

The upper portion 418 of upper stem member 400 has a reduced diameter creating upwardly facing annular shoulder 420. Removable backseat 402 is slipped over reduced portion 418 being of such a diameter as to engage shoulder 420. Spaced above the backseat 402, a distance equal to the thickness of backseat 402, is disposed an annular groove 422 for receiving split ring 424. A snap ring 426 is received in annular groove 428 in the outer periphery of split ring 424 to hold split ring 424 in position in groove 422.

Bonnet 408 includes a counterbore 430 coaxial with and adjacent to bore 406. Counterbore 430 is a stuffing box receiving a lower compression ring 432 resting on the upwardly facing annular shoulder 434 created by counterbore 430, a packing 436, and a follower compression ring 438 for actuation by gland 440 as gland 440 is threadingly received within counterbore 430.

A bleeder valve 442 is provided for communication with bore 406 by means of passage 444 to bleed pressure in order to change packing 436.

Backseat 402 has a downwardly extending annular seal flange 446 which has a lip 448 curving radially inwardly toward the stem 400. Backseat 402 is made of metal as for example steel. Backseat 402 is disposed on upper stem member 400 in such spaced relation that upon movement of the gate (not shown) to the closed flowway position, backseat 402 sealingly engages shoulder 412 by means of seal flange 446 and the engagement of flange 446 on shoulder 412 cams lip 448 into sealingly engagement with upper stem 400 to effect a metal-to-metal seal. Thus backseat 402 simultaneously seals at two points, shoulder 412 and stem 400.

Backseat 404 is disposed on upper stem member 400 above lug member 416 and in spaced relation with the opening of the gate whereby in the raised or open flowway position backseat 404 sealingly engages shoulder 414 creating a metal-to-metal seal.

The above are, of course, merely exemplary of possible changes or variations.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A valve, comprising:
   a valve body having an inlet and an outlet and upper and lower apertures with a chamber therebetween;
   a closure member preventing flow in the closed position and permitting flow in the open position;
   a seat disposed within the chamber and housing the closure member;
   seal means for sealing between said seat and said body at the outlet;
   means for moving said closure member between the open and closed positions;
   first and second cap members for closing said upper and lower apertures;
   first metal-to-metal seal means for sealing between said first cap member and said valve body;
   second metal-to-metal seal means for sealing between said second cap member and said valve body;
   said closure member extending through said chamber and said upper and lower apertures and into said first and second cap members;
   double seal ring means on said closure member providing a metal-to-metal sealing engagement with said first cap member in both the open and closed positions;
   single seal ring means on said closure member providing a metal-to-metal sealing engagement with said valve body at said lower aperture in one of the open and closed positions, and
   a lost motion connection in said closure member intermediate said single seal ring means and said double seal ring means to allow limited relative axial movement of said seal ring means.

2. A valve according to claim 1 wherein:
   said first cap member includes — a bonnet and a closure ring; said bonnet having a bore receiving said closure member and a counterbore receiving said closure ring;
   first sealing means providing a metal-to-metal sealing engagement between said closure ring and said bonnet; and
   said closure ring being symmetrical.

3. A valve according to claim 1 further comprising secondary seals providing back up sealing for said double seal ring means and said single seal ring means between said closure member and said first cap member and said valve body.

4. A valve comprising:
   a valve body having an inlet and an outlet and upper and lower apertures with a chamber therebetween;
   a closure member preventing flow in the closed position and permitting flow in the open position;
   a seat disposed within the chamber and housing the closure member;
   seal means for sealing between said seat and said body at the outlet;
   means for moving said closure member between the open and closed position;
   first and second cap members for closing said upper and lower apertures;
   first metal-to-metal seal means for sealing between said first cap member and said valve body;
   second metal-to-metal seal means for sealing between said second cap member and said valve body;

said closure member extending through said chamber and said upper and lower apertures and into said first and second cap members;

double seal ring means on said closure member providing a metal-to-metal sealing engagement with said first cap member in both the open and closed positions;

single seal ring means on said closure member providing a metal-to-metal sealing engagement with said valve body at said lower aperture in one of the open and closed positions; and said first metal-to-metal seal means including a metal gasket ring which engages said first cap member at points, the locus of which forms two annular rings on two planes, and which engages said valve body around said upper aperture at points, the locus of which forms one annular ring.

5. A valve comprising:
a valve body having an inlet and an outlet and upper and lower apertures with a chamber therebetween;
a closure member preventing flow in the closed position and permitting flow in the open position;
a seat disposed within the chamber and housing the closure member;
seal means for sealing between said seat and said body at the outlet;
means for moving said closure member between the open and closed position;
first and second cap members for closing said upper and lower apertures;
first metal-to-metal seal means for sealing between said first cap member and said valve body;
second metal-to-metal seal means for sealing between said second cap member and said valve body;
said closure member extending through said chamber and said upper and lower apertures and into said first and second cap members;
double seal ring means on said closure member providing a metal-to-metal sealing engagement with said first cap member in both the open and closed positions; and
single seal ring means on said closure member providing a metal-to-metal sealing engagement with said valve body at said lower aperture in one of the open and closed positions;
said first metal-to-metal seal means including a first frusto-conical seat, an annular seat and a metal ring gasket; said ring gasket being generally T-shaped having an inwardly extending annular flange and an axially extending annular flange; said upper aperture terminating in an upwardly facing frusto-conical shoulder; said first frusto-conical seat engaging said axially extending flange; said annular seat engaging said inwardly extending annular flange; and said frusto-conical shoulder engaging said axially extending flange.

6. A valve according to claim 5 wherein said metal ring gasket is deformable and has a diameter greater than the median diameter of said first frusto-conical seat.

7. A valve according to claim 5 wherein said first frusto-conical seat and annular seat are disposed in an annular groove in said first cap member; said inwardly extending annular flange extends below said annular seat; and said gasket, first frusto-conical seat, annular seat and frusto-conical shoulder are proportioned such that upon the initial engagement of said axially extending annular flange with said first frusto-conical seat and said frusto-conical shoulder, the distance between said inwardly extending annular flange and said annular seat is approximately one-half the distance between said valve body and said first cap member.

8. A valve according to claim 7 wherein upon the initial engagement of said annular seat and said inwardly extending annular flange the distance between said valve body and said first cap member is approximately one-half the distance between said valve body and said first cap member upon the initial engagement of said axially extending annular flange with said first frusto-conical seat and said frusto conical shoulder.

9. A valve comprising:
a valve body having an inlet and an outlet and upper and lower apertures with a chamber therebetween;
a closure member preventing flow in the closed position and permitting flow in the open position;
a seat disposed within the chamber and housing the closure member;
seal means for sealing between said seat and said body at the outlet;
means for moving said closure member between the open and closed positions;
first and second cap members for closing said upper and lower apertures;
first metal-to-metal seal means for sealing between said first cap member and said valve body;
second metal-to-metal seal means for sealing between said second cap member and said valve body;
said closure member extending through said chamber and said upper and lower apertures and into said first and second cap members;
double seal ring means on said closure member providing a metal-to-metal sealing engagement with said first cap member in both the open and closed positions;
single seal ring means on said closure member providing a metal-to-metal sealing engagement with said valve body at said lower aperture in one of the open and closed positions;
said first cap member includes — a bonnet and closure ring; said bonnet having a bore receiving said closure member and a counterbore receiving said closure ring;
first sealing means providing a metal-to-metal sealing engagement between said closure ring and said bonnet;
said closure ring being symmetrical;
said closure ring includes a first frusto-conical seat and an annular seat; said first metal-to-metal seal means including a metal ring gasket being generally T-shaped having an inwardly extending annular flange and an axially extending annular flange;
said upper aperture terminating in an upwardly facing frusto-conical shoulder;
said first frusto-conical seat engaging said axially extending flange; said annular seat engaging said inwardly extending annular flange; and said frusto-conical shoulder engaging said axially extending flange.

10. A valve according to claim 9 wherein said first frusto-conical seat and annular seat are disposed in an annular groove in said closure ring, said inwardly extending annular flange extends below said annular seat and said gasket, first frusto-conical seat, annular set and frusto- conical shoulder are proportioned such that upon the initial engagement of said axially extending annular flange with said first frusto-conical seat and said frusto conical shoulder, the distance between said inwardly extending annular flange and said annular seat is approximately one-half the distance between said valve body and said bonnet.

11. A valve comprising:
a valve body having an inlet and an outlet and upper and lower apertures with a chamber therebetween;
a closure member preventing flow in the closed position and permitting flow in the open position;
a seat disposed within the chamber and housing the closure member;
seal means for sealing between said seat and said body at the outlet;
means for moving said closure member between the open and closed positions;
first and second cap members for closing said upper and lower apertures;
first metal-to-metal seal means for sealing between said first cap member and said valve body;
second metal-to-metal seal means for sealing between said second cap member and said valve body;
said closure member extending through said chamber and said upper and lower apertures and into said first and second cap members;
double seal ring means on said closure member providing a metal-to-metal sealing engagement with said first cap member in both the open and closed positions;
single seal ring means on said closure member providing a metal-to-metal sealing engagement with said valve body at said lower aperture in one of the open and closed positions;
said seat and said body have interfitting portions at the outlet;
said seal means provides sealing engagement between said interfitting portions; said seal means including a non extrudable seal ring means and an extrudable seal ring; said non-extrudable seal ring means preventing said extrudable seal ring from extruding between said interfitting portions under pressure; and
said non-extrudable seal ring means includes wedging rings having opposing cam surfaces whereby upon pressure actuation one of said wedging rings cams onto the other said wedging ring thereby each said wedging ring sealing engaging one of said interfitting portions.

12. A valve according to claim 11 further including a back up ring supporting said wedging rings against a shoulder on said interfitting portion of said seat and received in a groove in said interfitting portion of said seat permitting limited movement of said backup ring.

13. A valve according to claim 12 wherein said extrudable seal ring includes a plastic ring disposed between said shoulder and one of said wedging rings.

14. A valve comprising:
a valve body having an inlet and an outlet and upper and lower apertures with a chamber therebetween;
a closure member preventing flow in the closed position and permitting flow in the open position;
a seat disposed within the chamber and housing the closure member and interfitting portions on said seat and in said body at the outlet;
seal means for sealing between said interfitting portions including a combination ring having a metal portion and a plastic portion disposed in an annular groove in the periphery of said seat, said metal ring engaging said interfitting portions at a downstream juncture between said interfitting portions and said plastic portion being forced against said metal portion by line pressure;
means for moving said closure member between the open and closed positions;
first and second cap members for closing said upper and lower apertures;
first metal-to-metal seal means for sealing between said first cap member and said valve body including a metal gasket ring which engages said first cap member at points, the locus of which forms two annular rings, and which engages said valve body at points, the locus of which forms one annular ring;
second metal-to-metal seal means for sealing between said second cap and said valve body;
said closure member extending through said chamber and said upper and lower apertures and into said first and second cap members;
double seal ring means on said closure member providing a metal-to-metal sealing engagement with said first cap member in both the open and closed positions including a double edged metal seal ring sealingly engaging a first metal seat on said first cap member in the open position and sealingly engaging a second metal seat on said first cap member in the closed position; and
single seal ring means on said closure member providing a metal-to-metal sealing engagement with said valve body near said lower aperture in one of the open and closed positions.

15. A valve comprising:
a valve body having an inlet and an outlet and upper and lower apertures with a chamber therebetween;
a closure member preventing flow from the inlet to the outlet in the closed position and permitting flow in the open position;
a seat disposed within the chamber and housing the closure member;
seal means for sealing between said seat and said body at the outlet;
means for moving said closure member between the open and closed positions;
first and second cap members closing said upper and lower apertures;
first metal-to-metal seal means sealingly engaging said first cap member and said valve body;
second metal-to-metal seal means engaging said second cap member and said valve body;
said closure member extending through said chamber and said upper and lower apertures and into said first and second cap members;
seal means on said closure member actuable by said moving means to provide a metal-to-metal sealing engagement with said first cap member in both the open and closed positions;
seal means on said closure member providing metal-to-metal sealing engagement with said valve body at said lower aperture in one of the open and closed positions;
said upper aperture terminating in an upwardly facing frusto-conical shoulder,
a downwardly facing frusto-conical shoulder in the bottom of the first cap member, and annular seat radially inwardly therefrom, and a generally T-shaped metal ring gasket having an axially extending annular flange engaging both of said frusto-conical shoulders and an inwardly extending annular flange engaging said annular seat.

* * * * *

UNITED STATES PATENT AND TRADEMARK OFFICE
CERTIFICATE OF CORRECTION

PATENT NO. : 4,029,294

DATED : JUNE 14, 1977

INVENTOR(S) : JOHN WALTON McCASKILL, ROBERT D. BARNETT, DAVID P. HERD

It is certified that error appears in the above-identified patent and that said Letters Patent are hereby corrected as shown below:

Column 2, line 61: After "seals", delete "provide" and insert -- provides --.

Column 2, line 17: After "of", delete "polytetrafluororoethylene" and insert -- polytetrafluoroethylene --.

Column 6, line 32: After "wall" delete "43" and insert -- 243 --.

Column 7, line 40: After "member", delete "80" and insert -- 90 --.

Column 8, line 8: After "188", insert -- 190, --.

Column 9, line 42: After "replace", delete "packing" and insert -- packings --.

Column 11, line 5: After "wedging", delete "or" and insert -- of --.

Column 11, line 54: After "into", delete "sealingly" and insert -- sealing --.

UNITED STATES PATENT AND TRADEMARK OFFICE
CERTIFICATE OF CORRECTION

PATENT NO. : 4,029,294
DATED : JUNE 14, 1977
INVENTOR(S) : JOHN WALTON McCASKILL, ROBERT D. BARNETT, DAVID P. HERD

It is certified that error appears in the above-identified patent and that said Letters Patent are hereby corrected as shown below:

Column 16, line 47: After "means", insert -- sealingly --.

Signed and Sealed this

Fifteenth Day of November 1977

[SEAL]

Attest:

RUTH C. MASON
Attesting Officer

LUTRELLE F. PARKER
Acting Commissioner of Patents and Trademarks